United States Patent [19]

Keigler et al.

[11] 3,977,633
[45] Aug. 31, 1976

[54] ORIENTATION SYSTEM FOR A SPIN STABILIZED SPACECRAFT

[75] Inventors: John Edward Keigler, Princeton; Ludwig Muhlfelder, Livingston; Robert Joseph Cenker, Princeton, all of N.J.

[73] Assignee: RCA Corporation, New York, N.Y.

[22] Filed: June 27, 1975

[21] Appl. No.: 590,900

Related U.S. Application Data

[63] Continuation of Ser. No. 416,579, Nov. 16, 1973, abandoned.

[52] U.S. Cl. .............................. 244/169; 244/322
[51] Int. Cl.² ....................................... B64G 1/10
[58] Field of Search .................. 244/171, 169, 322

[56] References Cited
UNITED STATES PATENTS

| | | | |
|---|---|---|---|
| 2,974,594 | 3/1961 | Boehm | 244/171 |
| 3,189,299 | 6/1965 | Garner et al. | 244/169 |
| 3,294,344 | 12/1966 | Rosen et al. | 244/171 |
| 3,384,323 | 5/1968 | Gilbert et al. | 244/169 |
| 3,446,023 | 5/1969 | Mosier | 244/3.22 |
| 3,490,719 | 1/1970 | Cantor et al. | 244/171 |
| 3,558,078 | 1/1971 | Lanzard | 244/169 |
| 3,612,442 | 10/1971 | Chisel | 244/3.22 |

OTHER PUBLICATIONS

Viskanta, V. Z. et al., "Conical Scanning System for Pioneer Jupiter Spacecraft," *IEEE Transactions on Aerospace and Electronic Systems*, vol. AES-8, No. 2, 3/72 pp.236–45.

*Primary Examiner*—Trygve M. Blix
*Assistant Examiner*—Barry L. Kelmachter
*Attorney, Agent, or Firm*—Edward J. Norton; Joseph D. Lazar; Michael M. Rickin

[57] ABSTRACT

A pair of reaction motors or thrusters connected to spin-stabilized spacecraft are used to reorient spacecraft attitude without affecting spacecraft velocity. The spacecraft reaction motors are arranged to produce a couple in response to an attitude reference signal without applying a spacecraft velocity changing force to the spin-stabilized spacecraft.

5 Claims, 2 Drawing Figures

ORIENTATION SYSTEM FOR A SPIN STABILIZED SPACECRAFT

This is a continuation of application Ser. No. 416,579, filed Nov. 16, 1973, now abandoned.

BACKGROUND OF THE INVENTION

1. Field of the Invention

This invention relates to spin stabilized spacecraft and more particularly to a reorientation system for automatically changing the attitude of a spin stabilized spacecraft without affecting spacecraft velocity.

2. Description of the Prior Art

Spacecraft attitude is changed by prior art attitude orientation systems using rockets or reaction motors connected to the spacecraft. Usually an appropriate spacecraft sensing device is used to detect deviations from a programmed spacecraft attitude and to generate signals which trigger the rockets into operation for affecting a desired spacecraft motion. Unfortunately, the use of reaction motors in some prior art spacecraft attitude orientation systems impart an undesirable change in spacecraft velocity as well as the desired change in spacecraft attitude. For this reason, an orientation system is disclosed for a spin stabilized spacecraft having multiple single thrust level reaction motors operating in response to an automatic sequence of control signals for affecting spacecraft attitude without changing spacecraft velocity.

Summary of the Invention

A system for changing attitude of a spin-stabilized vehicle without affecting vehicle velocity comprises an inertial sensing means connected to the vehicle for detecting an inertial point of reference and generating a signal in response to the detected inertial point of reference. Means coupled to the inertial sensing means generate vehicle attitude control signals in response to the inertial sensor generated signal. A pair of coplanar reaction devices mounted on the vehicle operate in response to the vehicle attitude control signals for applying to the vehicle equal and opposite thrust forces forming a couple producing a vehicle attitude changing torque. The thrust forces are arranged to establish a net thrust force applied to the vehicle of substantially zero magnitude, whereby the vehicle velocity is unaffected.

DETAILED DESCRIPTION OF THE PREFERRED EMBODIMENT

Figure 1:
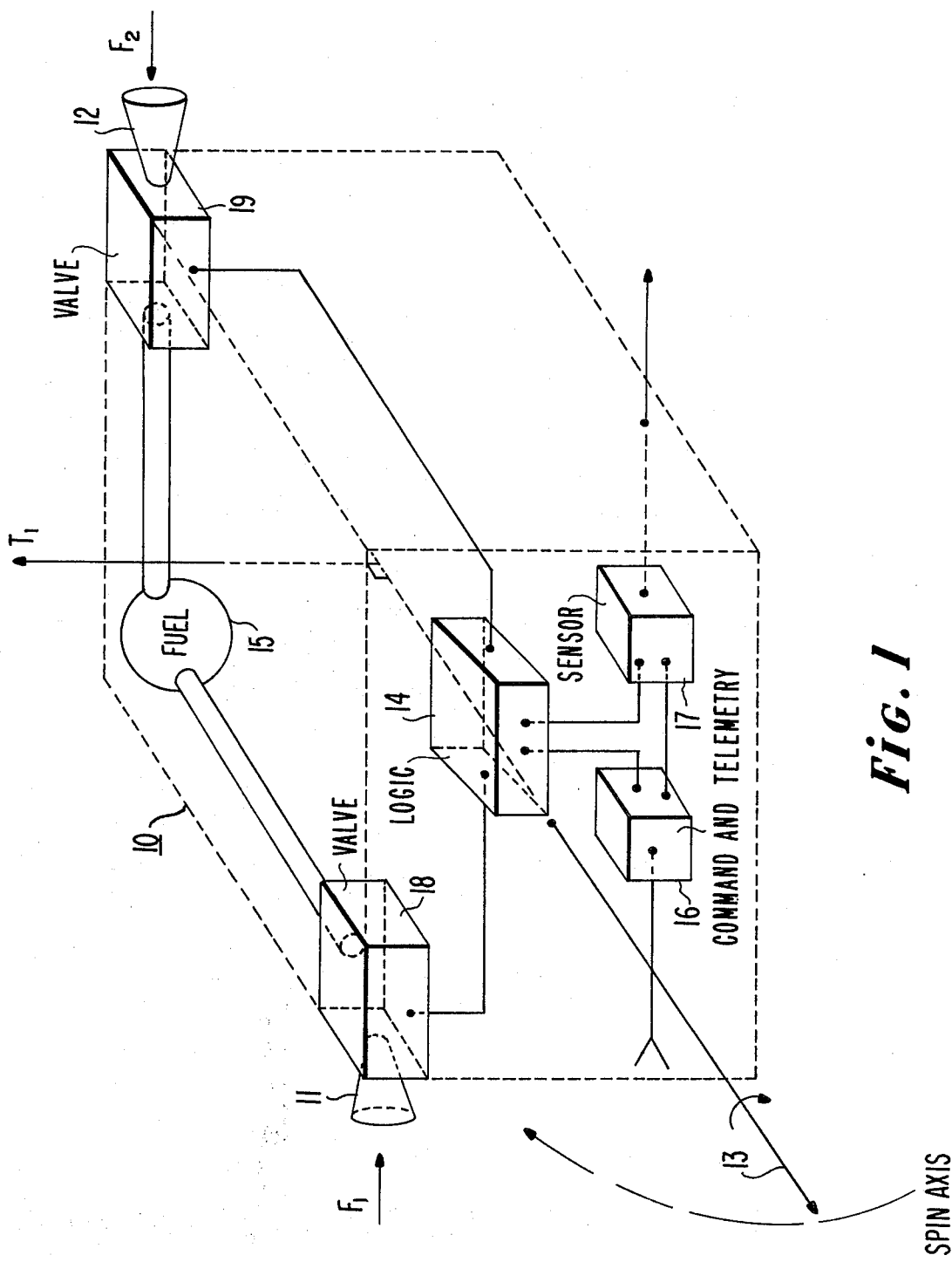
FIG. 1 is a diagrammatic representation of a spin-stabilized spacecraft having an attitude orientation system according to the invention which does not affect spacecraft velocity.

Referring to FIG. 1, there is shown a diagrammatic representation of a spin-stabilized spacecraft 10 having a spacecraft attitude orientation system which does not affect spacecraft velocity. At least one pair of suitable coplanar reaction-type propulsion motors or thrusters 11 and 12 are mounted on the outer periphery of spacecraft 10 such that when operated, thrusters 11 and 12 develop equal and opposite fixed magnitude thrust forces, $F_1$ and $F_2$, which are applied perpendicular to spin axis 13. Thrust forces, $F_1$ and $F_2$, are arranged to produce a couple which causes a torque or moment, represented by vector $T_1$, to be applied on spacecraft 10 orthogonal to spacecraft spin axis 13. However, a torque producing thrust force is capable of producing an undesirable change in spacecraft velocity but since thrust forces $F_1$ and $F_2$ are equal and opposite, the resulting net force applied to spacecraft 10 is substantially zero. Therefore, all forces causing an undesirable change in spacecraft velocity are cancelled. Although spacecraft 10 illustrates the use of only two thrusters 11 and 12, it is apparent that an arrangement of four thrusters may be used for nutation damping as disclosed in an article entitled "Two-Pulse Attitude Control of An Assymetric Spinning Satellite" by P. C. Wheeler published by the American Institute of Aeronautics and Astronautics in August, 1963.

Thrusters 11 and 12 are spinning about spin axis 13 since spacecraft 10 is spin-stabilized. In order to achieve a desired spacecraft attitude, thrusters 11 and 12 must be fired or operated when spacecraft 10 has rotated about spin axis 13 to the correct angular position for achieving a desired spacecraft attitude. In other words, the pointing direction of a unit vector aligned along spin axis 13 may be changed to a desired direction provided thrusters 11 and 12 are operated at a precise time corresponding to a particular angular position of thrusters 11 and 12.

It has been determined that for maximum thruster operating efficiency, thrusters 11 and 12 should each produce only a fixed magnitude of thrust force rather than multiple magnitudes of thrust force as used in some prior art systems. Therefore, in order to achieve a desired change in spacecraft attitude, thrusters 11 and 12 are simultaneously pulsed on and off for a predetermined time period described below. Each thruster operating time period is calculated to produce an incremental change in spacecraft attitude until the desired overall change in spacecraft attitude is achieved.

A suitable logic circuit 14 is provided to regulate the operation of thruster control valves 18 and 19 which in turn control the flow of suitable propellant from tank 15 to thrusters 11 and 12. Logic circuit 14 is arranged to operate in response to appropriately timed signals from a conventional command and telemetry system 16 and a suitable inertial sensor 17 such as Adcole sun sensor no. 17644 described in an article entitled "Digital Solar Aspect Systems" published by Adcole Corp., copyright 1967. Inertial sensor 17 is used to generate a signal indicating an angular position of spin-stabilized spacecraft 10 relative to an inertial frame of reference. Command and telemetry system 16 enables initiation of a desired spacecraft maneuver for changing spacecraft attitude by conducting a two-way communication between spacecraft 10 and a ground transmitter, not shown. Logic circuit 14 is arranged, as described below, to generate a series of pulsed signals determining thruster operating period and the appropriate time period thrusters 11 and 12 are to be operated in order to achieve a desired spin-stabilized spacecraft attitude.

The net force acting on spacecraft 10 is substantially zero since thrust force, $F_1$ is cancelled by equal and opposite thrust force $F_2$. However, as discussed above, thrust forces $F_1$ and $F_2$ cause a pure couple to act on spacecraft 10. This couple produces a torque causing a desired change in attitude. The magnitude of the torque or moment of the couple producing this change in spacecraft attitude is equal to the magnitude of either of the forces (designated in FIG. 1 as $F_1$ and $F_2$ and which are equal and oppositely directed) multiplied by the distance, $d$, between them, i.e. $F_1 \times d$ or $F_2 \times d$. Thus, the only motion effected by this set of forces comprising the couple discussed above is a counterclockwise change (for the example described) in spacecraft attitude due to the above described moment without change in spacecraft velocity since the net force applied to spacecraft 10 is substantially zero. In other words, spin-stabilized spacecraft attitude is changed by thrusters 11 and 12 producing a couple in response to a series of pulsed signals generated by logic circuit 14.

Figure 2:
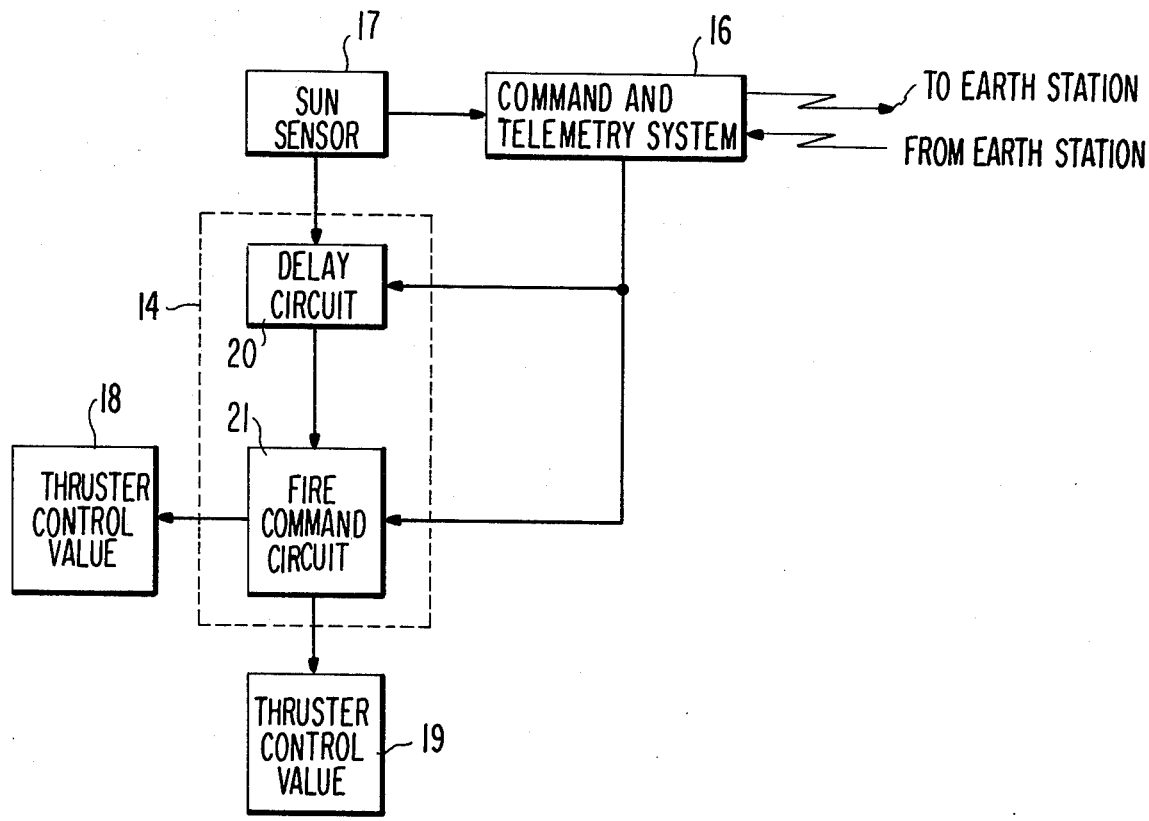
FIG. 2 is a block diagram of a logic circuit which is arranged to control the time and period of thruster operation.

Referring to FIG. 2, there is shown a block diagram of logic circuit 14 comprising a suitable delay circuit 20 coupled to a suitable firing command circuit 21. Delay circuit 20 is a prior art circuit suitably arranged to have an on condition, a stand-by condition and an off condition. When in the stand-by condition, delay circuit 20 is arranged to generate and transmit a fire command signal to fire command circuit 21 in response to a sun sensor generated signal. Fire command circuit 21 is a suitable prior art circuit arranged to generate a signal determining the thruster operating period in response to a fire command signal from either delay circuit 20 or command and telemetry system 16. For example, the thruster operating period can be determined by the pulse width of the coupled fire command signal. The signal generated by fire command circuit 21 is coupled to thruster control valves 18 and 19 which are arranged to permit propellant flow from tank 15 to thrusters 11 and 12, respectfully.

Sun sensor 17 is connected to the body of spacecraft 10 and is spinning about spacecraft spin axis 13 at the predetermined angular velocity of the spacecraft. Sun sensor 17 generates a signal each time it is exposed to the sun. Thus, the sun sensor generated signal establishes the orientation of spacecraft 10 relative to an inertial frame of reference. The sensor generated signal is simultaneously transmitted to both delay circuit 20 and command and telemetry system 16. Command and telemetry system 16 is arranged, as is well known in the art, to transmit sun sensor generated signals to and receive signals from an earth station transmitter/receiver, not shown.

Delay circuit 20 is suitably arranged, as known in the art, to be in the previously mentioned stand-by condition in response to an initiate signal or first signal transmitted from the earth station receiver/transmitter and coupled to delay circuit 20 via command and telemetry system 16. Prior to the reception of the initiate signal, delay circuit 20 is in an off condition and is not responsive or turned on by coupled sun sensor generated signals. While delay circuit 20 is in the standby condition, spin-stabilized spacecraft 10 is continuously rotating about spin axis 13 until sun sensor 17 is again exposed to the sun rays. The sun sensor generated signal resulting from sun exposure of sensor 17 is coupled to delay circuit 20 in the stand-by condition and after a predetermined delay time, described below, delay circuit 20 generates a fire command signal which is transmitted to fire command circuit 21. Fire command circuit 21 is suitably arranged to generate a pulsed signal having a pulse width which controls the operating time of thrusters 11 and 12 in response to fire command signals from either delay circuit 20 or command and telemetry system 16.

The delay time between coupling of a sun sensor generated signal to delay circuit 20 in the stand-by condition and the generation of the firing command signal by delay circuit 20 permits spin-stabilized spacecraft 10 to angularly rotate about spin axis 13 from the position where sensor 17 was exposed to the sun to the desired position for operating attitude correcting thrusters 11 and 12. Thus, the desired position for operating attitude correcting thrusters 11 and 12 is determined by the earth station after receiving the sun sensor generated signals and knowing the angular velocity of spacecraft 10. The sun sensor generated signal received by the earth station indicates the orientation of spacecraft 10 relative to an inertial frame of reference, for example, the sun. Thus, the relative angular position of spacecraft 10 at any later instant of time is predictable knowing spacecraft angular velocity and the time the sun sensor signal is received by the earth station. If a change in spacecraft attitude is desired, thrusters 11 and 12 are fired at a time calculated to produce a spacecraft attitude change in the desired direction. The magnitude of the thrust force and the period of thruster 11 and 12 operation determine the degree of spacecraft attitude change. It should be noted that thrusters 11 and 12 are pulsed producing fixed thrust forces perpendicular to spin axis 13, $F_1$ and $F_2$ respectfully, over a period determined by the arrangement of firing circuit 21.

The delay time between coupling of the sun sensor generated signal to delay circuit 20 in the stand-by condition and the generation of the delay circuit firing command signal is variable and may be determined in the following manner. Delay circuit 20 includes a suitable counter circuit, not shown, arranged to be triggered into operation or start counting time in response to a sun sensor generated signal coupled to delay circuit 20 in the stand-by condition. After a sun sensor generated signal is coupled to delay circuit 20 in the stand-by condition, a fire command signal is transmitted from the earth station transmitter/receiver to spacecraft 10 and simultaneously coupled to both delay circuit 20 and fire command circuit 21 via command and telemetry system 16. The portion of the earth station fire command signal coupled to delay circuit 20 turns off the counter circuit and resets it to zero time. When activated by the remaining portion of earth station fire command signal, fire command circuit 21 generates an appropriate pulsed signal for firing thrusters 11 and 12.

Delay circuit 20 still remains in the stand-by condition and is responsive to sun sensor generated signals when the delay counter circuit is reset to zero time. The time period between coupling a sun sensor generated signal to delay circuit 20 in the stand-by condition and the coupling of the earth station fire command signals to delay circuit 20 is stored in delay circuit 20 and is referred to as the predetermined delay time provided by delay circuit 20. Each succeeding sun sensor generated signal coupled to delay circuit 20, (after the predetermined delay time is stored in delay circuit 20), triggers the delay circuit counter into operation and after the previously described predetermined delay time, delay circuit 20 generates a fire command signal which is coupled to fire command circuit 21. When activated by the delay circuit fire command signal, fire command circuit 21 generates an appropriate pulsed signal for firing thrusters 11 and 12.

The pulsed operation of thrusters 11 and 12 is continued until a termination pulse is transmitted from the earth station transmitter/receiver to spacecraft 10. The termination pulse is coupled to delay circuit 20 via command and telemetry system 16. Delay circuit 20 is arranged to have an off condition in response to the termination pulse transmitted by the earth station. It should be noted as previously mentioned, delay circuit 20 is not responsive or turned on by coupled sun sensor generated signals while in an off condition.

In summary, an attitude orientation system for a spin-stabilized spacecraft 10 is disclosed. The disclosed attitude orientation system have thrusters 11 and 12 arranged on spacecraft 10 to generate equal and opposite forces, $F_1$ and $F_2$, respectfully, forming a couple for developing a spacecraft attitude controlling torque without imparting a force causing a change in spacecraft velocity. Thrust forces, $F_1$ and $F_2$, are perpendicular to spacecraft spin axis 11 and 12 thereby producing an attitude controlling torque vector perpendicular to spin axis 13. The resulting net force applied to spacecraft 10, due to operation of thrusters 11 and 12, is substantially zero since thrust forces $F_1$ and $F_2$ are equal in magnitude and opposite in direction. Therefore, the attitude of spin-stabilized spacecraft 10 is changed without imparting a spacecraft change in velocity by using at least one pair of thrusters arranged on spin-stabilized spacecraft 10 to form a couple having forces $F_1$ and $F_2$ perpendicular to spin axis 13.

It should be understood that the invention can be used in any spacecraft having at least a spin-stabilized mode of operation. Although certain spacecraft are stabilized for a substantial portion of the mission life by techniques other than being spun, the invention may be embodied therein by providing a spin stabilized mode during which suitably positioned reaction motors or thrusters are energized when reorientation of the attitude of the spacecraft is desired. The design of each such spacecraft is within the skill of the art in view of the teachings of the present invention and, accordingly, need not be described in any further detail.

It will be thus apparent that variations and modifications of the embodiment described may be made without departing from the present invention. Accordingly, it should be clearly understood that the form of the present invention described above and shown in the figures of the accompanying drawing is illustrative only and is not intended to limit the scope of the invention.

What is claimed is:

1. A system for changing attitude of a spin-stabilized vehicle having a spin axis without affecting vehicle velocity comprising:

inertial sensing means connected to said vehicle for detecting an inertial point of reference and generating a pulsed signal in response to said detected inertial point of reference;

means coupled to said inertial sensing means for generating pulsed vehicle attitude control signals in response to said inertial sensor generated signal; and a pair of coplanar reaction means mounted on said vehicle in a plane parallel to said spin axis and operating in response to said vehicle attitude control signals for applying to said vehicle equal and opposite thrust forces perpendicular to the spin axis of said vehicle and for forming a couple producing a vehicle attitude changing torque perpendicular to the spin axis and being arranged to establish a net thrust force applied to said vehicle of substantially zero magnitude, whereby said vehicle velocity is substantially unaffected.

2. A system according to claim 1, wherein said inertial sensing means is a sun sensor.

3. A system according to claim 1, wherein said means for generating pulsed vehicle attitude control signals include logic circuit means coupled to said inertial sensing means, said logic circuit means having a delay circuit coupled to a fire command circuit.

4. A system according to claim 3, wherein said delay circuit is arranged to generate and transmit fire command signal to said fire command circuit after a predetermined time period in response to said inertial sensor generated signal.

5. A system according to claim 4, wherein said fire command circuit is arranged to generate a signal determining an operation period for said reaction devices.

* * * * *